(12) United States Patent
Chen et al.

(10) Patent No.: US 8,668,051 B2
(45) Date of Patent: Mar. 11, 2014

(54) LUBRICATING DEVICE FOR LINEAR TRANSMISSION MECHANISM

(75) Inventors: Kuan-Chun Chen, Taichung (TW); Wu-Teng Hsieh, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 207 days.

(21) Appl. No.: 13/435,999

(22) Filed: Mar. 30, 2012

(65) Prior Publication Data
US 2013/0256063 A1    Oct. 3, 2013

(51) Int. Cl.
*F16N 11/08*    (2006.01)

(52) U.S. Cl.
USPC .......................................................... 184/37

(58) Field of Classification Search
USPC ................................... 184/36, 5, 37; 137/386
See application file for complete search history.

(56) References Cited

U.S. PATENT DOCUMENTS

| | | | | |
|---|---|---|---|---|
| 4,582,369 | A * | 4/1986 | Itoh | 384/13 |
| 5,380,097 | A * | 1/1995 | Tanaka | 384/13 |
| 6,155,717 | A * | 12/2000 | Michioka et al. | 384/15 |
| 6,401,867 | B1 * | 6/2002 | Michioka et al. | 184/5 |
| 7,146,870 | B2 * | 12/2006 | Kuo et al. | 74/89.44 |
| 7,357,576 | B2 * | 4/2008 | Chen et al. | 384/13 |
| 7,410,300 | B2 * | 8/2008 | Chen et al. | 384/13 |
| 7,513,336 | B2 * | 4/2009 | Hsu et al. | 184/5 |
| 7,556,430 | B2 * | 7/2009 | Wu et al. | 384/13 |
| 7,607,514 | B2 * | 10/2009 | Chuo | 184/5 |
| 7,614,790 | B2 * | 11/2009 | Liu et al. | 384/13 |
| 7,909,512 | B2 * | 3/2011 | Kuwabara et al. | 384/13 |
| 8,251,586 | B2 * | 8/2012 | Kondo | 384/13 |
| 2003/0164264 | A1 * | 9/2003 | Luo | 184/5 |
| 2004/0245049 | A1 * | 12/2004 | Vullhorst | 184/5 |
| 2005/0173195 | A1 * | 8/2005 | Anita et al. | 184/5 |
| 2006/0163005 | A1 * | 7/2006 | Chuo | 184/5 |
| 2006/0204151 | A1 * | 9/2006 | Wang et al. | 384/13 |
| 2006/0231335 | A1 * | 10/2006 | Lin et al. | 184/5 |
| 2007/0012516 | A1 * | 1/2007 | Hsu et al. | 184/5 |
| 2007/0137931 | A1 * | 6/2007 | Chin-Pei et al. | 184/5 |
| 2008/0149424 | A1 * | 6/2008 | Chen et al. | 184/105.3 |

FOREIGN PATENT DOCUMENTS

TW    I260374    8/2006
TW    I263744    10/2006

* cited by examiner

*Primary Examiner* — William A Rivera
*Assistant Examiner* — Michael Riegelman
(74) *Attorney, Agent, or Firm* — Muncy, Geissler, Olds & Lowe, P.C.

(57) ABSTRACT

A lubricating device used in a linear transmission mechanism is disclosed to include a housing having an accommodation chamber and an opening formed on the inside and periphery thereof in equal cross section, a pressure member axially movable in the accommodation chamber, a screw rod pivotally mounted in the housing and having a first transmission portion located on one end thereof and extended out of the pressure member, a screw nut threaded onto the screw rod and driven by the screw rod to stop against the pressure member outside, a transmission member defining therein a transmission slot and a second transmission portion and a third transmission portion at two opposite sides of the transmission slot for alternatively rotating the first transmission portion, and driving device for reciprocating the transmission member.

6 Claims, 8 Drawing Sheets

LUBRICATING DEVICE FOR LINEAR TRANSMISSION MECHANISM

BACKGROUND OF THE INVENTION

1. Field of the Invention

The present invention relates to lubricating technology and more particularly, to a lubricating device for linear transmission mechanism.

2. Description of the Related Art

A regular liner transmission device, for example, linear guideway, generally comprises a guide member and a movable member, for example, a rail and a sliding block. The guide member is magnetically conductive, comprising at least one mounting hole for mounting at a support. The movable member is movable along the guide. The guide member and the movable member may wear quickly after a long use.

To solve the aforesaid wearing problem, two measures may be adopted. One measure is to coat the guide member with a layer of oil-containing material. The other measure is to install a lubricating device in the movable member to continuously dispense a storage lubricating oil. The aforesaid two measures can achieve a lubricating effect. Taiwan Patent Publication Number 1260374 discloses a lubricating device for this purpose. This design comprises a lubricant dispenser detachably mounted on the linear guideway for lubricating the linear guideway. By means of connecting a male connector and a female connector together, an oil passage defined in the male and female connectors is kept in communication between a nozzle hole of an end cap and an oil outlet of the lubricant dispenser for guiding the storage lubricating oil out of the lubricant dispenser into the nozzle hole of the end cap for lubricating the linear guideway. This design has the advantages of simple structure and ease of use. However, this design can simply dispense a lubricating oil of high flowability. It is not suitable for use in a place where a high level of environmental cleanliness should be maintained, such as clean room. For use in a clean room, a viscous lubricating grease should be used instead of a high volatility of lubricating oil. Thus, this design cannot satisfy the demands.

Further, Taiwan Patent Publication Number 1263744 discloses a lubricant dispenser, comprising an oil tank, a connector and a lubricant applicator. The oil tank comprises an oil transferring device. The connector has an oil absorbing substance mounted therein and kept in contact with the oil transferring device and the lubricant applicator for allowing the storage lubricating oil to be transferred from the oil tank to the grooved surface of the rail of the linear guideway. Further, the connector has two connecting portions respectively disposed at two distal ends thereof. One connecting portion is inserted through the lubricant applicator and coupled to the sliding block of the linear guideway. The other connecting portion is connected to the oil tank by a joint. This design is convenient for application. However, this design still cannot satisfy the demand because it is simply suitable for dispensing a lubricating oil of high flowability.

SUMMARY OF THE INVENTION

The present invention has been accomplished under the circumstances in view. It is the main object of the present invention to provide a lubricating device for linear transmission mechanism, which uses a lubricating grease to lubricate a linear transmission mechanism, eliminating the disadvantage of high volatility of a lubricating oil and allowing the linear transmission mechanism to be used in any place where a high level of environmental cleanliness should be maintained.

To achieve this and other objects of the present invention, a lubricating device is mounted on a linear transmission mechanism consisting of a guide member and a movable member. The guide member is magnetically conductive, comprising at least one mounting hole for mounting. The movable member is movable along the guide member. The lubricating device comprises a housing, a screw rod, a pressure member, a screw nut, a transmission member and a driving device. The housing is connected to movable member of the linear transmission mechanism and movable with the movable member and defining an axial direction and a radial direction. Further, the housing comprises an accommodation chamber and an opening extending along the axial direction and respectively formed on the inside and periphery thereof in equal cross section, and a lubricant dispensing hole disposed in communication with the accommodation chamber. The screw rod is mounted in the accommodation chamber along the axial direction, comprising a first end piece located on one end thereof and pivotally coupled to the housing, a second end piece located on an opposite end thereof, and a first transmission portion formed of a part of the periphery of the second end piece. The pressure member fits the opening in shape and is mounted in the accommodation chamber and movable along the axial direction, comprising a through hole for the passing of the second end piece of the screw rod. The pressure member defines with the housing a lubricant storage chamber in the accommodation chamber in communication with the lubricant dispensing hole. The volume of the lubricant storage chamber is relatively changed subject to movement of the pressure member in the accommodation chamber. The screw nut is threaded onto the screw rod, and driven by the screw rod to stop against the pressure member outside the lubricant storage chamber. The transmission member is located in the accommodation chamber outside the lubricant storage chamber and movable back and forth along the radial direction, comprising a transmission slot, a second transmission portion disposed in the transmission slot at one lateral side and a third transmission portion disposed in the transmission slot at the opposite lateral side. The second transmission portion and the third transmission portion are respectively disposed at two opposing sides relative to the first transmission portion of the screw rod and alternatively driven to rotate the first transmission portion in forcing the screw nut against the pressure member. The driving device is connected to the transmission member, and adapted for reciprocating the transmission member.

By means of the lubricating device provided by the present invention, the user can store a lubricating grease in the lubricant storage chamber and drive the driving device to reciprocate the transmission member. Thus, the second transmission portion and the third transmission portion can alternatively rotate the first transmission portion to move the screw nut against the pressure member, causing the pressure member to squeeze the storage lubricating grease out of the lubricant dispensing hole for lubricating the linear transmission mechanism.

DETAILED DESCRIPTION OF THE INVENTION

Figure 1:
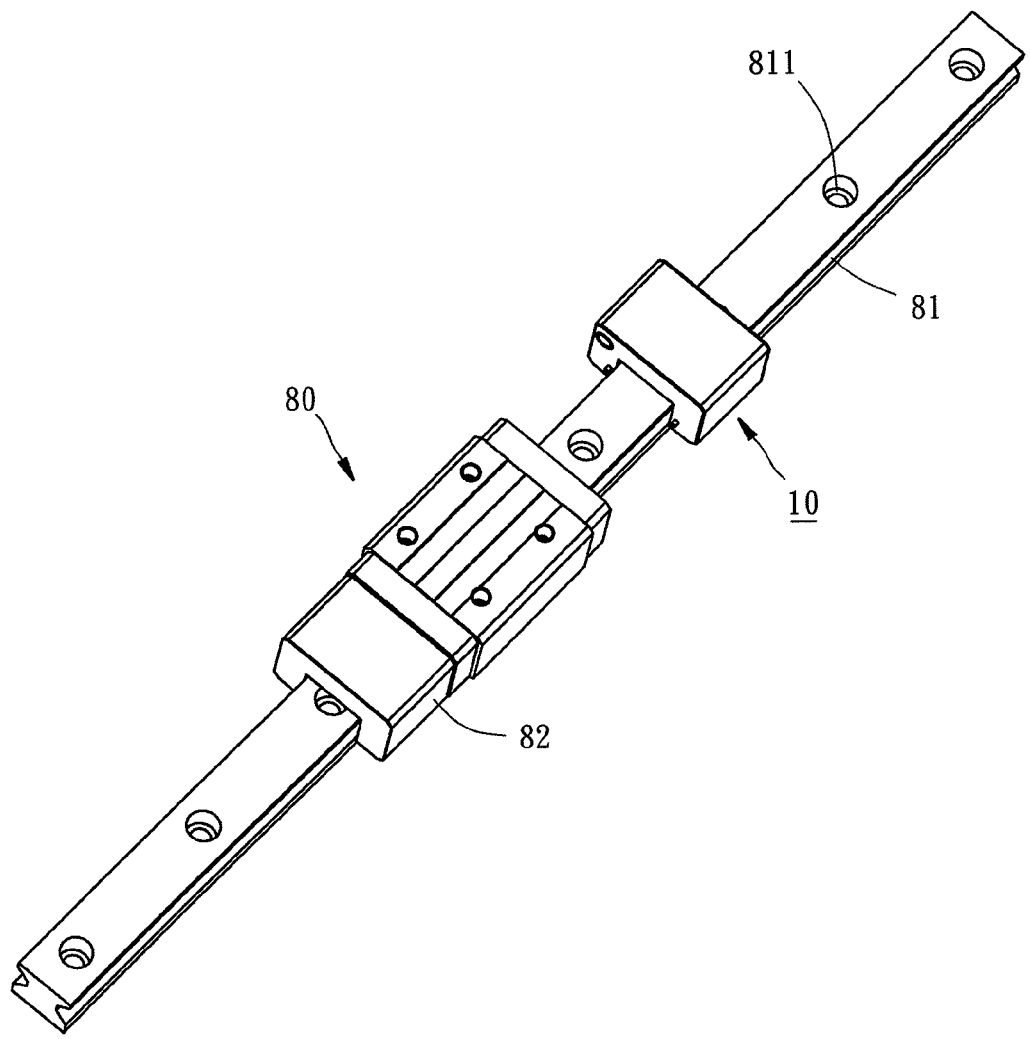
FIG. 1 is a schematic drawing illustrating a lubricating device mounted on a linear transmission mechanism in accordance with the present invention.
Figure 2:
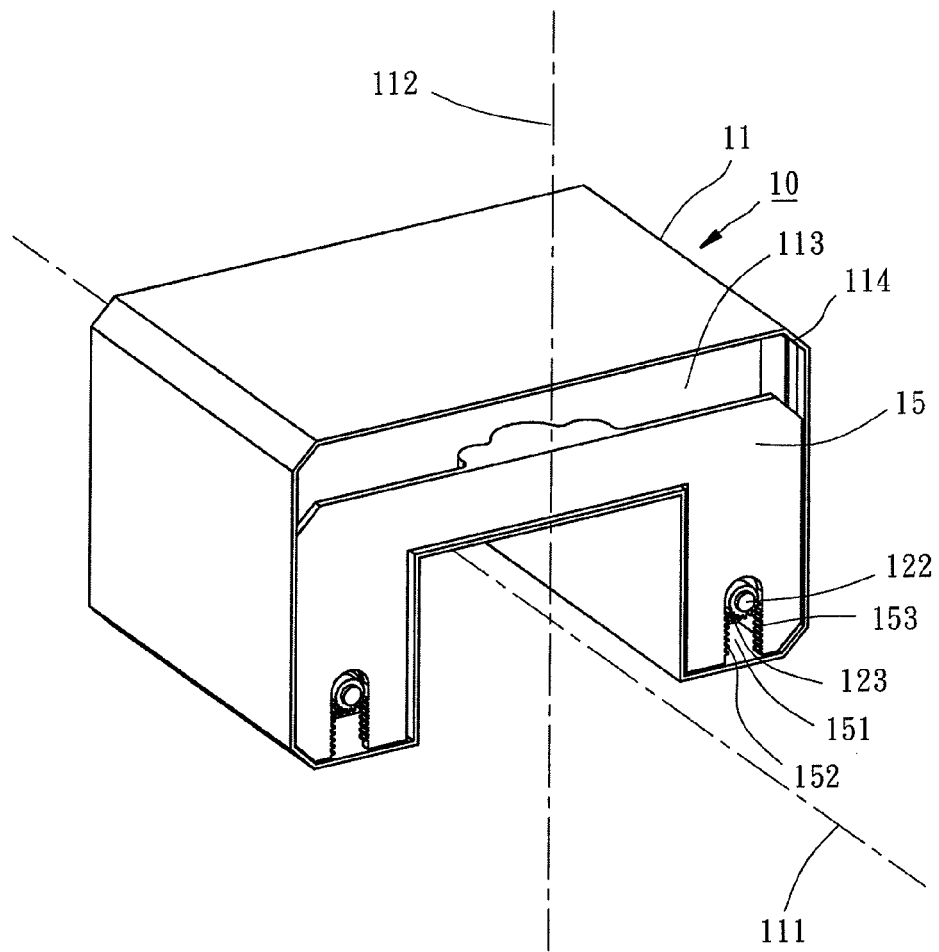
FIG. 2 is an elevational view of the lubricating device in accordance with the present invention.
Figure 3:
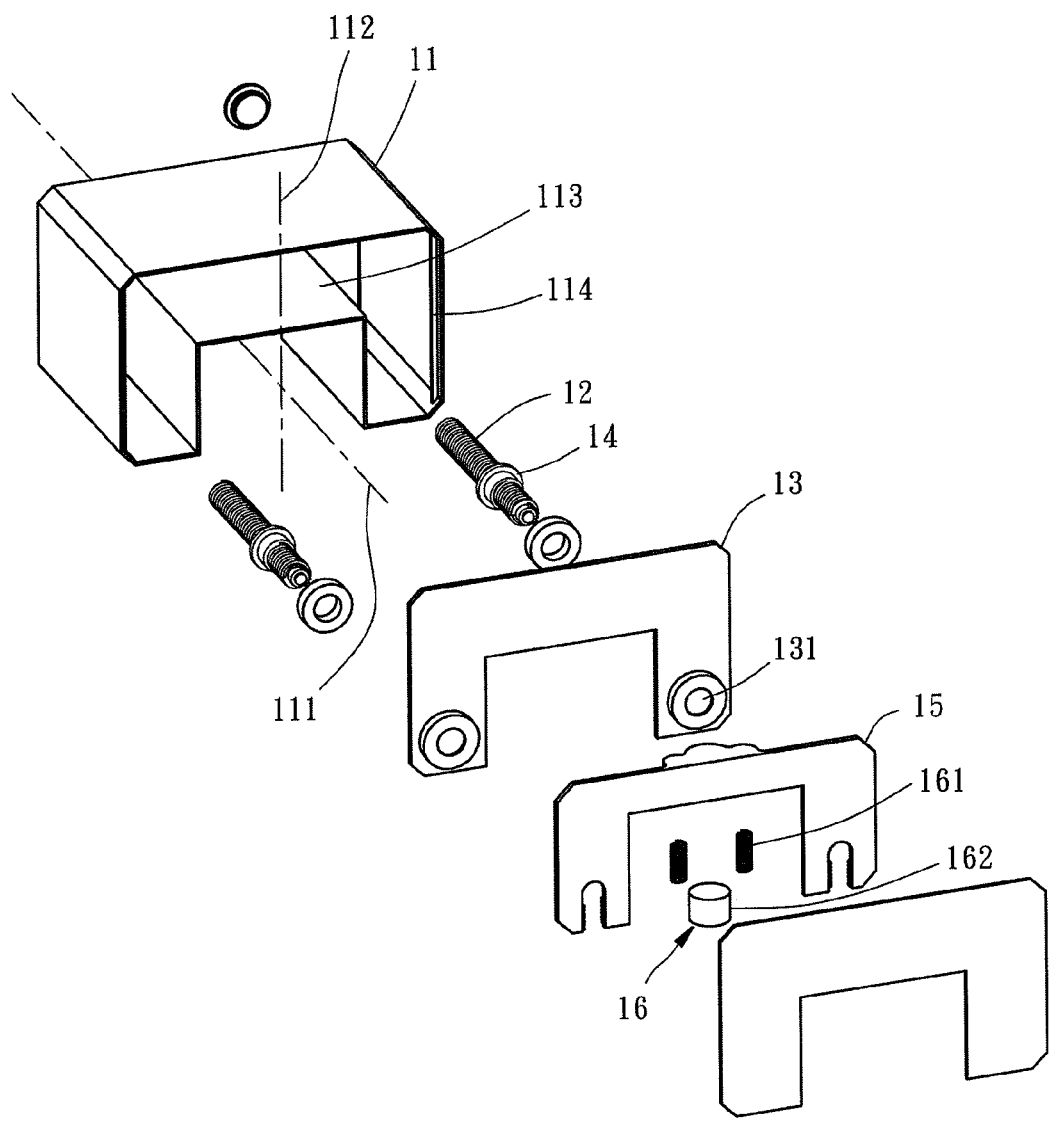
FIG. 3 is an exploded view of the lubricating device in accordance with the present invention.
Figure 4:
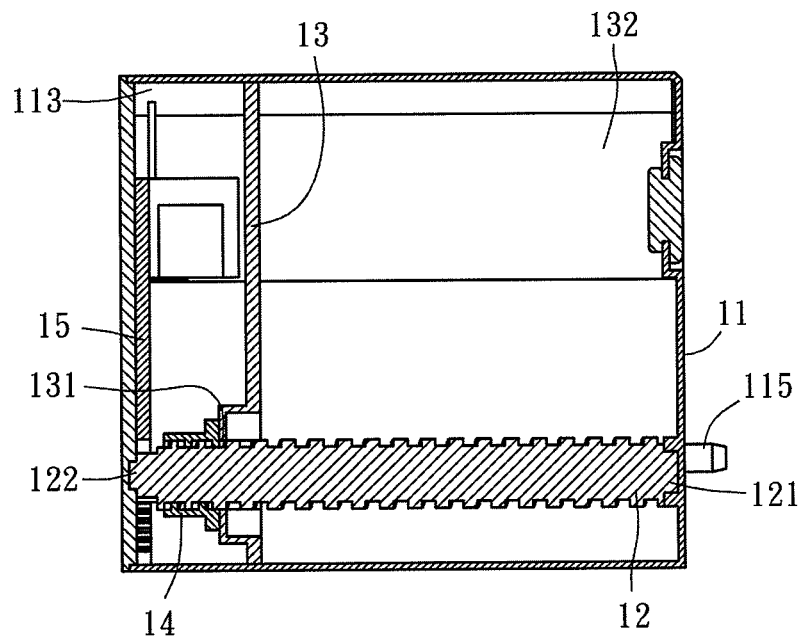
FIG. 4 is a schematic sectional view of the lubricating device in accordance with the present invention.

The advantages and features of the present invention will be fully understood by reference to the following examples in conjunction with the accompanying drawings.

Referring to FIGS. 1-5, a lubricating device 10 is shown mounted on a linear transmission mechanism 80. The linear transmission mechanism 80 comprises a guide member 81, and a movable member 82. The guide member 81 is magnetic conductive, having at least one mounting hole 811 for mounting. The movable member 82 is movable along the guide member 81. The lubricating device 10 comprises a housing 11, a screw rod 12, a pressure member 13, a screw nut 14, a transmission member 15 and a driving device 16.

The housing 11 is connected to the movable member 82 of the linear transmission mechanism 80 and movable with the movable member 82, defining an axial direction 111 and a radial direction 112. The housing 11 comprises an accommodation chamber 113 and an opening 114 extending along the axial direction 111 and respectively formed on the inside and periphery thereof in equal cross section, and a lubricant dispensing hole 115 disposed in communication with the accommodation chamber 113.

The screw rod 12 is mounted in the accommodation chamber 113 along the axial direction, comprising a first end piece 121 located on one end thereof and pivotally coupled to the housing 11, a second end piece 122 located on an opposite end thereof, and a first transmission portion 123 formed of a part of the periphery of the second end piece 122.

The pressure member 13 fits the opening 114 in shape. Further, the pressure member 13 is mounted in the accommodation chamber 113 and movable along the axial direction 111, comprising a through hole 131 for the passing of the second end piece 122 of the screw rod 12. The pressure member 13 defines with the housing 11 a lubricant storage chamber 132 in the accommodation chamber 113. The lubricant storage chamber 132 is kept in communication with the lubricant dispensing hole 115. Further, subject to movement of the pressure member 13 in the accommodation chamber 113, the volume of the lubricant storage chamber 132 is relatively changed.

The screw nut 14 is threaded onto the screw rod 12, and driven by the screw rod 12 to stop against the pressure member 13 outside the lubricant storage chamber 132.

The transmission member 15 is located in the accommodation chamber 113 outside the lubricant storage chamber 132, and movable back and forth along the radial direction 112. The transmission member 15 comprises a transmission slot 151, a second transmission portion 152 disposed in the transmission slot 151 at one lateral side, and a third transmission portion 153 disposed in the transmission slot 151 at the opposite lateral side. When moving the transmission member 15 to drive the screw rod 12, the second transmission portion 152 and the third transmission portion 153 are respectively disposed at two opposing sides of the first transmission portion 123 of the screw rod 12 and alternatively driven to rotate the first transmission portion 123, keeping the screw nut 14 to stop against the pressure member 13.

The driving device 16 is connected to the transmission member 15, and adapted for reciprocating the transmission member 15.

During application, the user fills a lubricating grease into the lubricant storage chamber 132. Thereafter, the driving device 16 drives the transmission member 15 to move back and forth along the axial direction 111. During the reciprocating motion of the transmission member 15, the second transmission portion 152 and the third transmission portion 153 alternatively rotate the first transmission portion 123, causing the screw nut 14 to be moved against the pressure member 13, and therefore the pressure member 13 is forced to squeeze the storage lubricating grease out of the lubricant dispensing hole 115. It is to be noted that, the screw nut 14 is stopped at the pressure member 13, and the friction resistance produced between the screw nut 14 and the pressure member 13 prohibits the screw nut 14 from rotation with the screw rod 12, and therefore the screw nut 14 can force the pressure member 13 toward the inside of the housing 11 to squeeze the storage lubricating grease out of the lubricant dispensing hole 115 during rotation of the screw rod 12. If the storage lubricating grease in the lubricant storage chamber 132 hinders the movement of the pressure member 13, the screw nut 14 will be unstable to move the pressure member 13, i.e., the pressure of the storage lubricating grease overcomes the friction resistance between the screw nut 14 and the pressure member 13, causing the screw nut 14 to be rotated with the screw rod 12.

By means of the lubricating device provided by the present invention, the user can store a lubricating grease in the lubricant storage chamber 132 and drive the driving device 16 to reciprocate the transmission member 15. Thus, the second transmission portion 152 and the third transmission portion 153 can alternatively rotate the first transmission portion 123 to move the screw nut 14 against the pressure member 13, causing the pressure member 13 to squeeze the storage lubricating grease out of the lubricant dispensing hole 115 for lubricating the linear transmission mechanism.

Figure 5:
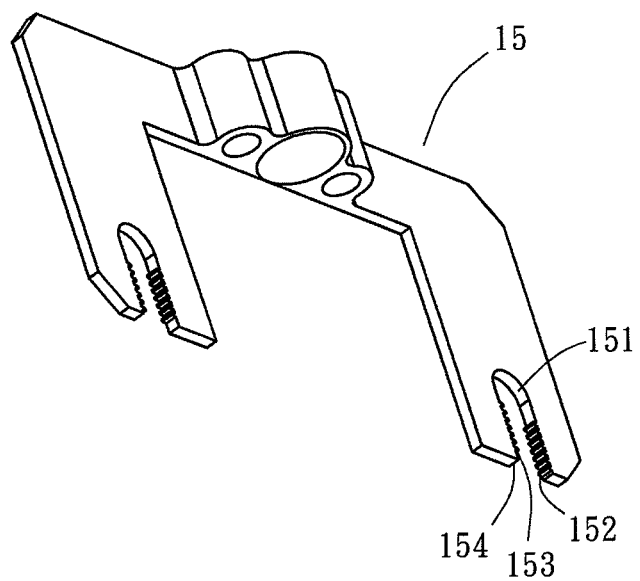
FIG. 5 is an elevational view of the transmission member of the lubricating device in accordance with the present invention.
Figure 6:
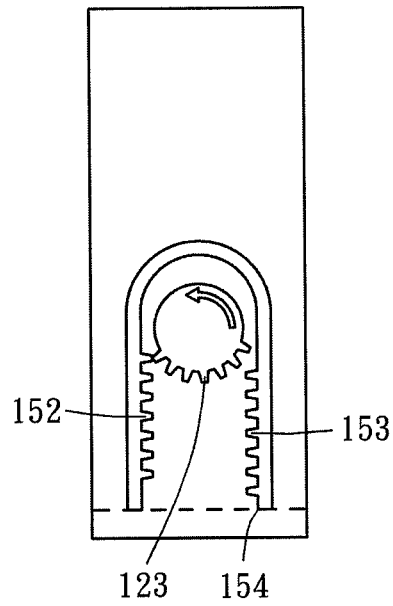
FIG. 6 is a schematic drawing illustrating an operation action of the lubricating device in accordance with the present invention.
Figure 7:
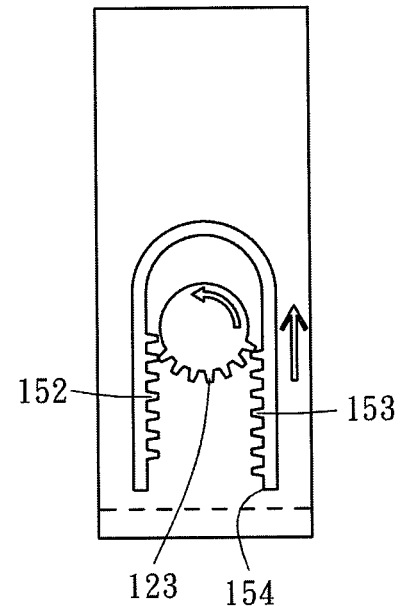
FIG. 7 is a schematic drawing illustrating another operation action of the lubricating device in accordance with the present invention.
Figure 8:
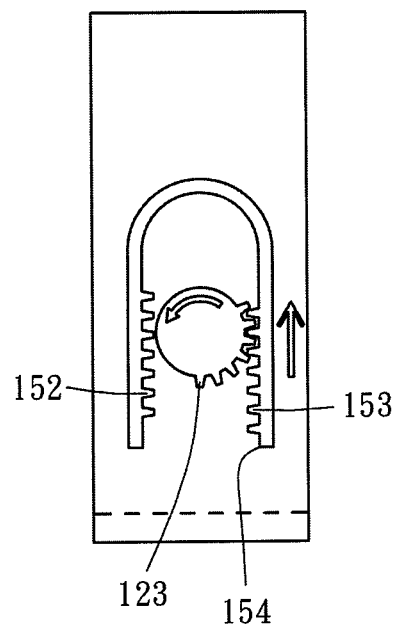
FIG. 8 is a schematic drawing illustrating still another operation action of the lubricating device in accordance with the present invention.
Figure 9:
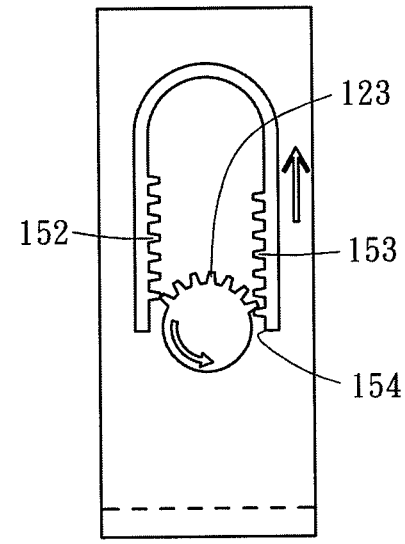
FIG. 9 is a schematic drawing illustrating still another operation action of the lubricating device in accordance with the present invention.
Figure 10:
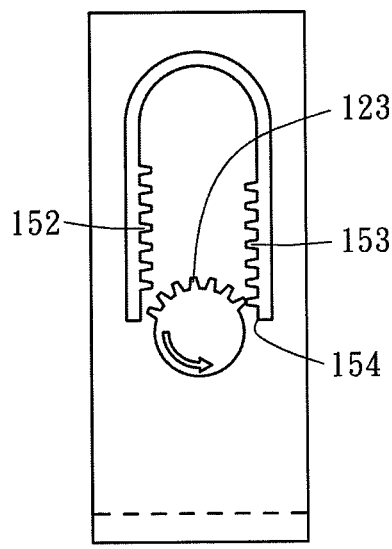
FIG. 10 is a schematic drawing illustrating still another operation action of the lubricating device in accordance with the present invention.
Figure 11:
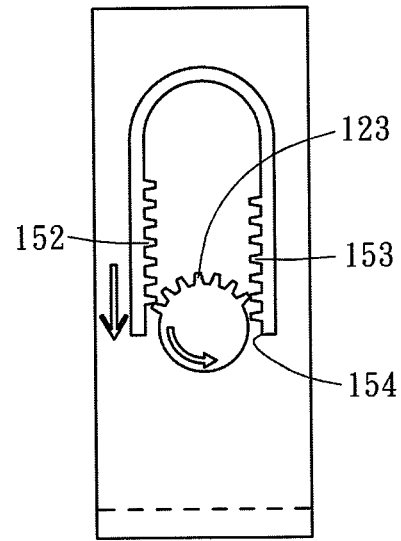
FIG. 11 is a schematic drawing illustrating still another operation action of the lubricating device in accordance with the present invention.
Figure 12:
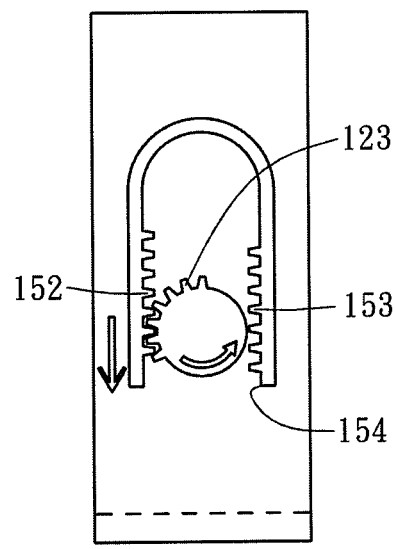
FIG. 12 is a schematic drawing illustrating still another operation action of the lubricating device in accordance with the present invention.
Figure 13:
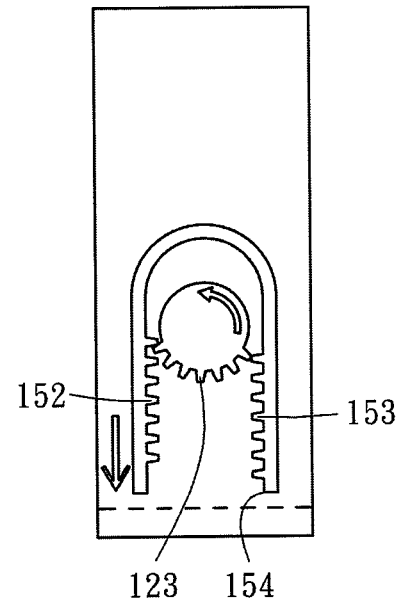
FIG. 13 is a schematic drawing illustrating still another operation action of the lubricating device in accordance with the present invention.

Referring to FIG. 5, in this embodiment, the transmission slot 151 forms a slot mouth 154 in the transmission member 15; the first transmission portion 123, the second transmission portion 152 and the third transmission portion 153 are tooth racks; the second transmission portion 152 is meshed with the first transmission portion 123, and driven to rotate the first transmission portion 123; the third transmission portion 153 is meshed with the first transmission portion 123, and driven to rotate the first transmission portion 123; the second transmission portion 152 and the third transmission portion 153 have the same length but are kept away from the slot mouth 154 at different distances.

As stated above, the first transmission portion 123, the second transmission portion 152 and the third transmission portion 153 in this embodiment are tooth racks. Alternatively, the first transmission portion 123, the second transmission portion 152 and the third transmission portion 153 can be a respective coarse surface. In this case, the second transmission portion 152 can rub against the first transmission portion 123, thereby rotating the first transmission portion 123; the third transmission portion 153 can rub against the first transmission portion 123, thereby rotating the first transmission portion 123. Similarly, the coarse surface design of the second transmission portion 152 and the coarse surface design of the third transmission portion 153 have the same length, however, they are kept away from the slot mouth 154 at different distances.

Referring to FIG. 6 through FIG. 13, an application example of the present invention, in which the first transmission portion 123, the second transmission portion 152 and the third transmission portion 153 are respectively formed of a tooth rack, is shown. When the transmission slot 151 of the transmission member 15 is being moved toward the first transmission portion 123 of the screw rod 12, the second transmission portion 152 and the third transmission portion 153 are alternatively forced to rotate the first transmission portion 123. The second transmission portion 152 and the third transmission portion 153 can alternatively rotate the first transmission portion 123 only under the condition that the second transmission portion 152 and the third transmission portion 153 have the same length but are kept away from the slot mouth 154 at different distances.

Figure 14:
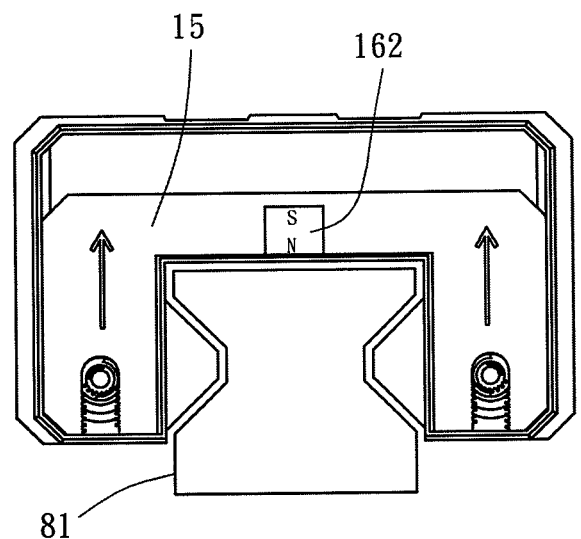
FIG. 14 is a schematic drawing illustrating still another operation action of the lubricating device in accordance with the present invention.
Figure 15:
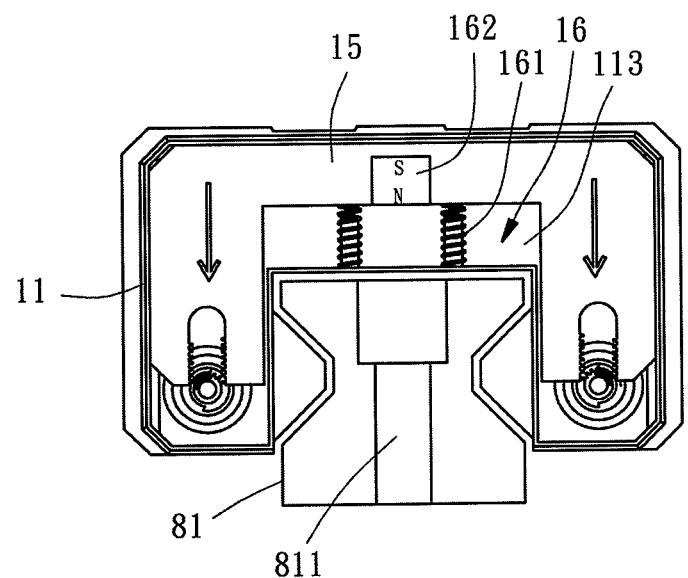
FIG. 15 is a schematic drawing illustrating still another operation action of the lubricating device in accordance with the present invention.

Referring to FIGS. 14 and 15 and FIGS. 3 and 6 again, the driving device 16 comprises an elastic member 161 and a first magnetic member 162. The elastic member 161, for example, compression spring, is set between the housing 11 and the transmission member 15, and stopped against the transmission member 15 and the housing 11 inside the accommodation chamber 113. The first magnetic member 162 is connected to the transmission member 15, and adapted for moving the transmission member 15 to overcome the spring force of the elastic member 161 and to move toward the guide member 81. Thus, the lubricating device 10 that is mounted on the movable member 82 can be moved with the movable member 82 along the guide member 81 over the mounting hole 811. As the guide member 81 is magnetically conductive, the first magnetic member 162 of the driving device 16 can carry the transmission member 15 to overcome the spring force of the elastic member 161 and to move toward the guide member 81 when the lubricating device 10 is moved with the movable member 82 along the guide member 81. When the lubricating device 10 is moved over the mounting hole 811, the magnetic attractive force that attracts the first magnetic member 162 toward the guide member 81 is relatively decreased, causing the spring force of the elastic member 161 to push the transmission member 15 away from the guide member 81. Subject to the aforesaid mechanism, moving the movable member 82 along the guide member 81 causes the transmission member 15 to move along the radial direction 112, driving the screw rod 12 to move the screw nut 14 against the pressure member 13.

Figure 16:
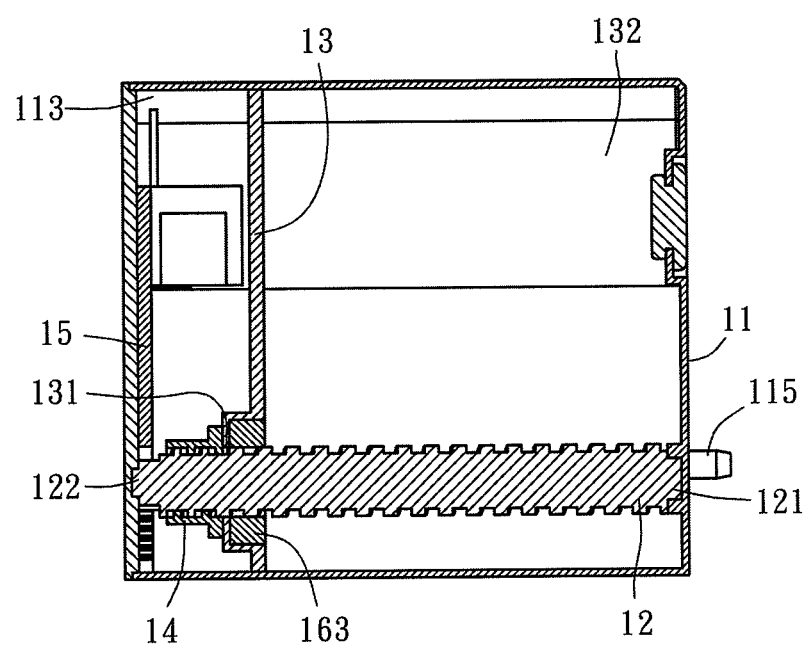
FIG. 16 is a schematic sectional view of an alternate form of the lubricating device in accordance with the present invention.

Referring to FIG. 16, an alternate form of the lubricating device in accordance with the present invention is shown. This alternate form is substantially similar to the embodiment shown in FIGS. 1-15 with the exception that a second magnetic member 163 is connected to the pressure member 13 for attracting the screw nut 14 to adjust the friction force between the screw nut 14 and the pressure member 13. Because the pressure imparted by the pressure member 13 is determined subject to the friction force between the pressure member 13 and the screw nut 14, enhancing the friction force between the pressure member 13 and the screw nut 14 avoids rotation of the screw nut 14 with the screw rod 12 and increases the pressure of the screw nut 14 against the pressure member 13. On the contrary, the screw nut 14 will be rotated with the screw rod 12 to reduce the pressure of the screw nut 14 against the pressure member 13 if the friction force between the pressure member 13 and the screw nut 14 is excessively low. By means of using the second magnetic member 163 to attract the screw nut 14 and adjusting the attractive force between the second magnetic member 163 and the screw nut 14, the friction force between the screw nut 14 and the pressure member 13 is relatively adjusted.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A lubricating device mounted on a linear transmission mechanism comprising a guide member and a movable member, said guide member being magnetically conductive and comprising at least one mounting hole for mounting, said movable member being movable along said guide member, the lubricating device comprising:

a housing connected to said movable member of said linear transmission mechanism and movable with said movable member, said housing defining an axial direction and a radial direction, said housing comprising an accommodation chamber and an opening extending along said axial direction and respectively formed on the inside and periphery thereof in equal cross section, and a lubricant dispensing hole disposed in communication with said accommodation chamber;

a screw rod mounted in said accommodation chamber along said axial direction, said screw rod comprising a first end piece located on one end thereof and pivotally coupled to said housing, a second end piece located on an opposite end thereof, and a first transmission portion formed of a part of the periphery of said second end piece;

a pressure member fitting said opening in shape and mounted in said accommodation chamber and movable along said axial direction, said pressure member comprising a through hole for the passing of said second end piece of said screw rod, said pressure member defining with said housing a lubricant storage chamber in said accommodation chamber, said lubricant storage chamber being kept in communication with said lubricant dispensing hole, the volume of said lubricant storage chamber being relatively changed subject to movement of said pressure member in said accommodation chamber;

a screw nut threaded onto said screw rod and driven by said screw rod to stop against said pressure member outside said lubricant storage chamber;

a transmission member is located in said accommodation chamber outside said lubricant storage chamber and movable back and forth along said radial direction, said transmission member comprising a transmission slot, a second transmission portion disposed in said transmission slot at one lateral side and a third transmission portion disposed in said transmission slot at the opposite lateral side, said second transmission portion and said third transmission portion being respectively disposed at two opposing sides relative to said first transmission portion of said screw rod and alternatively driven to rotate said first transmission portion in forcing said screw nut against said pressure member; and a driving device connected to said transmission member and adapted for reciprocating said transmission member.

2. The lubricating device as claimed in claim 1, wherein said transmission slot defines a slot mouth in said transmission member; said first transmission portion, said second transmission portion and said third transmission portion are tooth racks; said second transmission portion is meshed with said first transmission portion and drivable to rotate said first transmission portion; said third transmission portion is meshed with said first transmission portion and drivable to rotate said first transmission portion; said second transmission portion and said third transmission portion have a same length and are kept away from said slot mouth at different distances.

3. The lubricating device as claimed in claim 1, wherein said transmission slot defines a slot mouth in said transmission member; said first transmission portion, said second transmission portion and said third transmission portion are coarse surfaces; said second transmission portion is meshed with said first transmission portion and drivable to rotate said first transmission portion; said third transmission portion is meshed with said first transmission portion and drivable to rotate said first transmission portion; said second transmission portion and said third transmission portion have a same length and are kept away from said slot mouth at different distances.

4. The lubricating device as claimed in claim 2, wherein said driving device comprises an elastic member and a first magnetic member, said elastic member being set between said housing and said transmission member and stopped against said transmission member and said housing inside said accommodation chamber, said first magnetic member being connected to said transmission member and adapted for moving said transmission member to overcome the spring force of said elastic member and to move toward said guide member.

5. The lubricating device as claimed in claim 1, further comprising a second magnetic member connected to said pressure member and adapted for attracting said screw nut to adjust the friction force between said screw nut and said pressure member.

6. The lubricating device as claimed in claim 3, wherein said driving device comprises an elastic member and a first magnetic member, said elastic member being set between said housing and said transmission member and stopped against said transmission member and said housing inside said accommodation chamber, said first magnetic member being connected to said transmission member and adapted for moving said transmission member to overcome the spring force of said elastic member and to move toward said guide member.

* * * * *